(No Model.)

J. R. & R. N. GEBBY.
CORN HARVESTER.

No. 425,315. Patented Apr. 8, 1890.

Witnesses:
E. P. Ellis,
L. J. Magie,

Inventors.
J. R. Gebby,
R. N. Gebby,
per F. W. Lehmann, atty.

UNITED STATES PATENT OFFICE.

JOHNSON R. GEBBY AND RANKIN N. GEBBY, OF NEW RICHLAND, ASSIGNORS OF ONE-HALF TO JAMES D. CAMPBELL AND PHILIP F. CAMPBELL, OF BELLE CENTRE, OHIO.

CORN-HARVESTER.

SPECIFICATION forming part of Letters Patent No. 425,315, dated April 8, 1890.

Application filed December 7, 1889. Serial No. 332,872. (No model.)

*To all whom it may concern:*

Be it known that we, JOHNSON R. GEBBY and RANKIN N. GEBBY, of New Richland, in the county of Logan and State of Ohio, have invented certain new and useful Improvements in Corn-Harvesters; and we do hereby declare the following to be a full, clear, and exact description of the invention, such as will enable others skilled in the art to which it pertains to make and use it, reference being had to the accompanying drawings, which form part of this specification.

Our invention relates to an improvement in corn-harvesters; and it consists in the combination of the frame mounted on wheels, so as to be drawn along between the rows, slotted hinged tapering wings attached to opposite sides of this frame, metallic blades attached to the wings, revolving pointed cutters secured to adjustable supports, and guides for conducting the stalks to the cutters, as will be more fully described hereinafter.

The object of our invention is to produce a corn-harvester in which the revolving cutters can be adjusted back and forth upon wings, which are narrower at their front than their rear ends, so that the cutters can be adjusted to the width of the rows to be cut.

Figure 1:
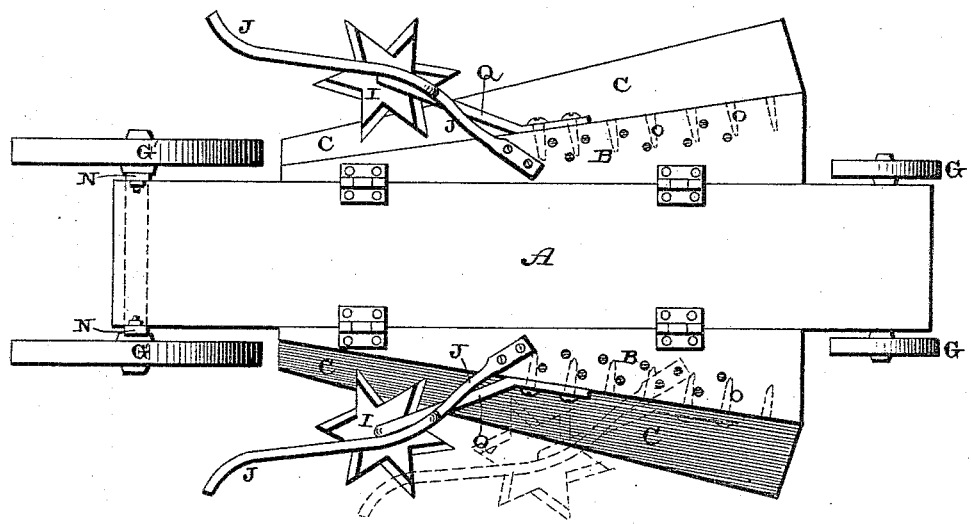
Figure 2:
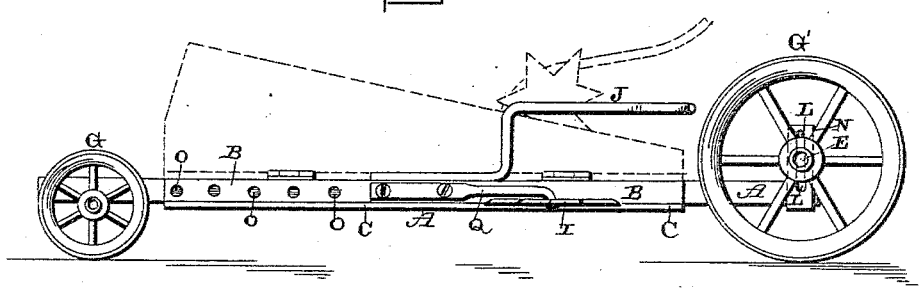

Figure 1 is a plan view of a corn-harvester which embodies my invention. Fig. 2 is a side elevation of the same.

A represents a narrow frame, which is mounted upon wheels, so that it can be drawn along between the rows of corn which are to be cut. The rear wheels G are smaller than the front ones, as this end of the frame is to be maintained at a uniform height. The front wheels G' are mounted on short spindles E, which are vertically adjustable in the slots L in the turned-up ends of the axle N, rigidly secured to the front end of the frame. By making the spindles vertically adjustable the front end of the frame can be adjusted to the height of the corn to be cut. Hinged to opposite sides of the frame are the wings B, which taper in width from their rear to their front ends, and which are adapted to be raised into a vertical position, carrying all their attachments with them, or let down into a horizontal position when the machine is ready for operation. These wings B are hinged to the frame, so that the cutters will be made to skip those stalks which are to be left standing. In these wings B are made the holes or slots O, and upon the edges of the wings, by means of pins or screws, which are inserted into the holes or slots, are placed the adjustable supporting-slides Q, upon which the revolving pointed cutters I are journaled. Rigidly secured to the outer edges of these wings are the plates C, which are narrower at their front than their rear ends, and against the outer edges of which the revolving cutters cut the stalks as the machine is drawn along.

The supporting-slides Q and cutters I are made adjustable back and forth along the outer edges of the plates C, so as to adapt the cutters to the width of the rows to be cut. Owing to the tapering shape of the wings and plates it is only necessary to know the width between the rows, when the cutters can be adjusted into position to cut both rows at once. If desired, the outer edges of the plates may be sharpened, so as to assist in the cutting of the stalks, or they may be left square and the cutters alone sharpened. The supporting-slides may be locked in place by means of pins, which pass into the wings, or by means of set-screws, as may be desired. Also secured upon the tops of the wings B are the bent rods J, which extend a suitable distance above and out in advance of the cutters, and which serve to catch the stalk which are out of line with cutters and incline them into position to be caught by them. These rods are screwed or bolted in position, and can be adjusted back and forth with the cutters, as may be found necessary.

The cutters are first adjusted to the width of the rows, and if necessary the rods J are adjusted also. The machine is then drawn between the rows carrying a suitable number of men who catch the stalks as they are cut and lay them upon the frame. As the frame is drawn along, the cutters catch the standing stalks, and being compelled to revolve by the pressure of the stalks the cutters revolve and cut them off, thus saving time and labor over the old manner of cutting the stalks by hand.

Having thus described our invention, we claim—

The combination of the frame mounted on wheels, the hinged wings made wider at their rear than at their front ends, and blades secured thereto, the supports adjustable forward and backward on the wings, the revolving cutters on the supports, and the bent guide-rods, the blades being made wider at their rear than their front ends, substantially as shown.

In testimony whereof we affix our signatures in presence of two witnesses.

JOHNSON R. GEBBY.
RANKIN N. GEBBY.

Witnesses:
M. L. MAINS,
J. W. YOUNG.